United States Patent
Schricker et al.

(10) Patent No.: US 6,510,731 B2
(45) Date of Patent: *Jan. 28, 2003

(54) METHOD FOR DETERMINING A WEAK CYLINDER IN AN INTERNAL COMBUSTION ENGINE

(75) Inventors: David R. Schricker, Dunlap, IL (US); Conrad G. Grembowicz, Peoria, IL (US)

(73) Assignee: Caterpillar Inc, Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,008

(22) Filed: Jun. 28, 1999

(65) Prior Publication Data

US 2002/0020212 A1 Feb. 21, 2002

(51) Int. Cl.⁷ .............................................. G01M 15/00
(52) U.S. Cl. ........................ 73/117.3; 73/112; 701/104
(58) Field of Search ................................ 73/116, 117.2, 73/117.3, 118.1, 112, 113; 340/425.5, 438, 439; 701/99, 101, 102, 103, 104

(56) References Cited

U.S. PATENT DOCUMENTS

| | | | |
|---|---|---|---|
| 5,205,152 A | | 4/1993 | Clarke et al. ................... 73/9 |
| 5,582,151 A | * | 12/1996 | Wertheimer ................ 123/435 |
| 5,787,855 A | | 8/1998 | Mueller et al. ............. 123/198 |
| 5,819,714 A | * | 10/1998 | Bush et al. |
| 5,868,116 A | | 2/1999 | Betts et al. ................. 123/481 |
| 5,878,366 A | | 3/1999 | Schricker et al. .......... 701/101 |
| 5,884,603 A | * | 3/1999 | Matsuki |
| 5,983,876 A | * | 11/1999 | Irons et al. ................ 123/478 |
| 6,002,980 A | * | 12/1999 | Taylor et al. ................ 73/116 |
| 6,082,187 A | * | 7/2000 | Schricker et al. ............ 73/116 |
| 6,199,007 B1 | * | 3/2001 | Zavarehi et al. ............. 73/116 |
| 6,209,520 B1 | * | 4/2001 | Kolmanovsky et al. ..... 123/435 |

* cited by examiner

Primary Examiner—Eric S. McCall
(74) Attorney, Agent, or Firm—Steve D Lundquist

(57) ABSTRACT

A method for determining a condition of a cylinder in an internal combustion engine having a plurality of cylinders. The method includes the steps of reducing an amount of power being generated by a first cylinder, increasing an amount of power being generated by each of the remaining cylinders, monitoring a condition of the engine, and determining the condition of the first cylinder in response to the monitored condition of the engine.

12 Claims, 2 Drawing Sheets

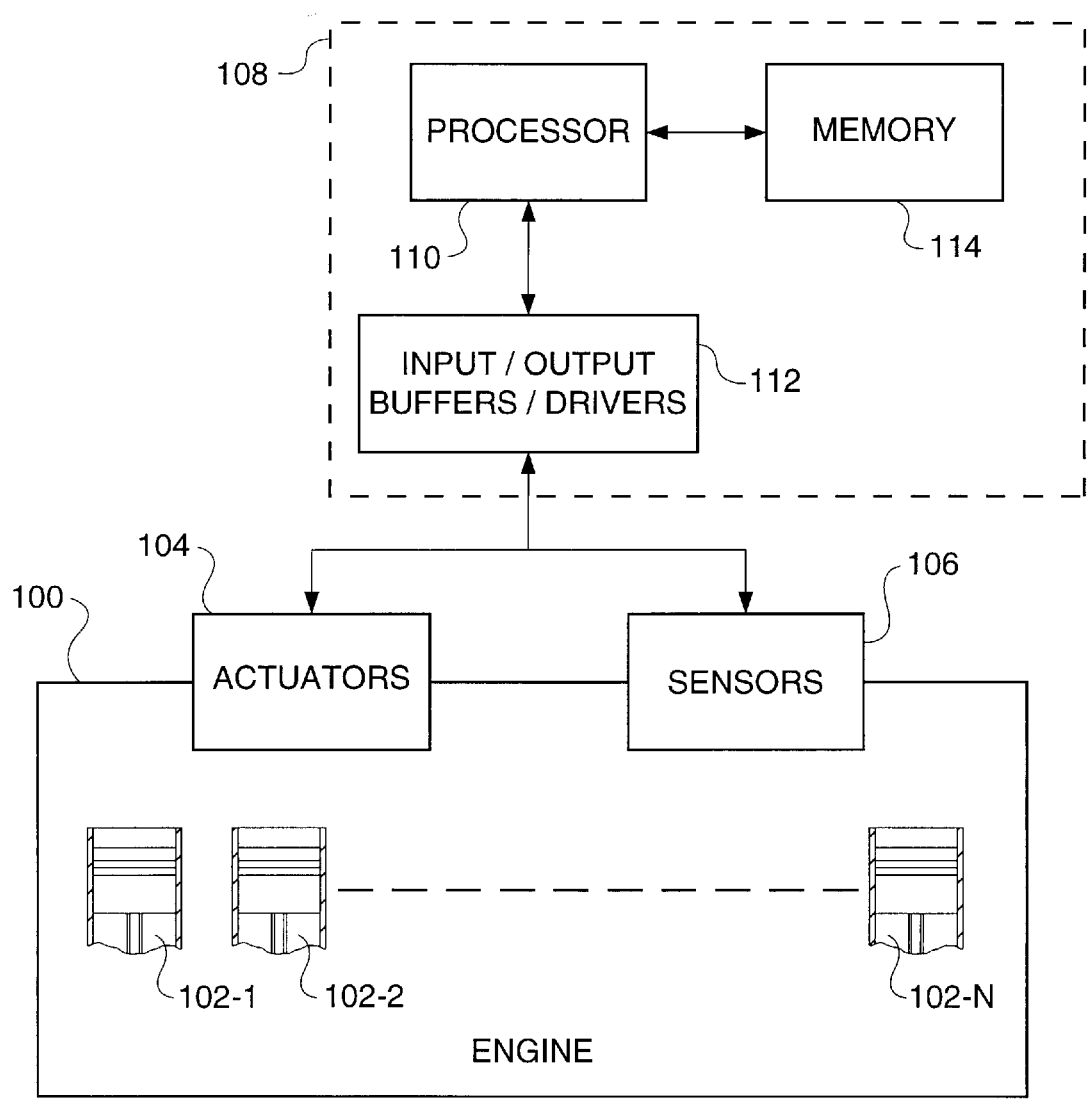

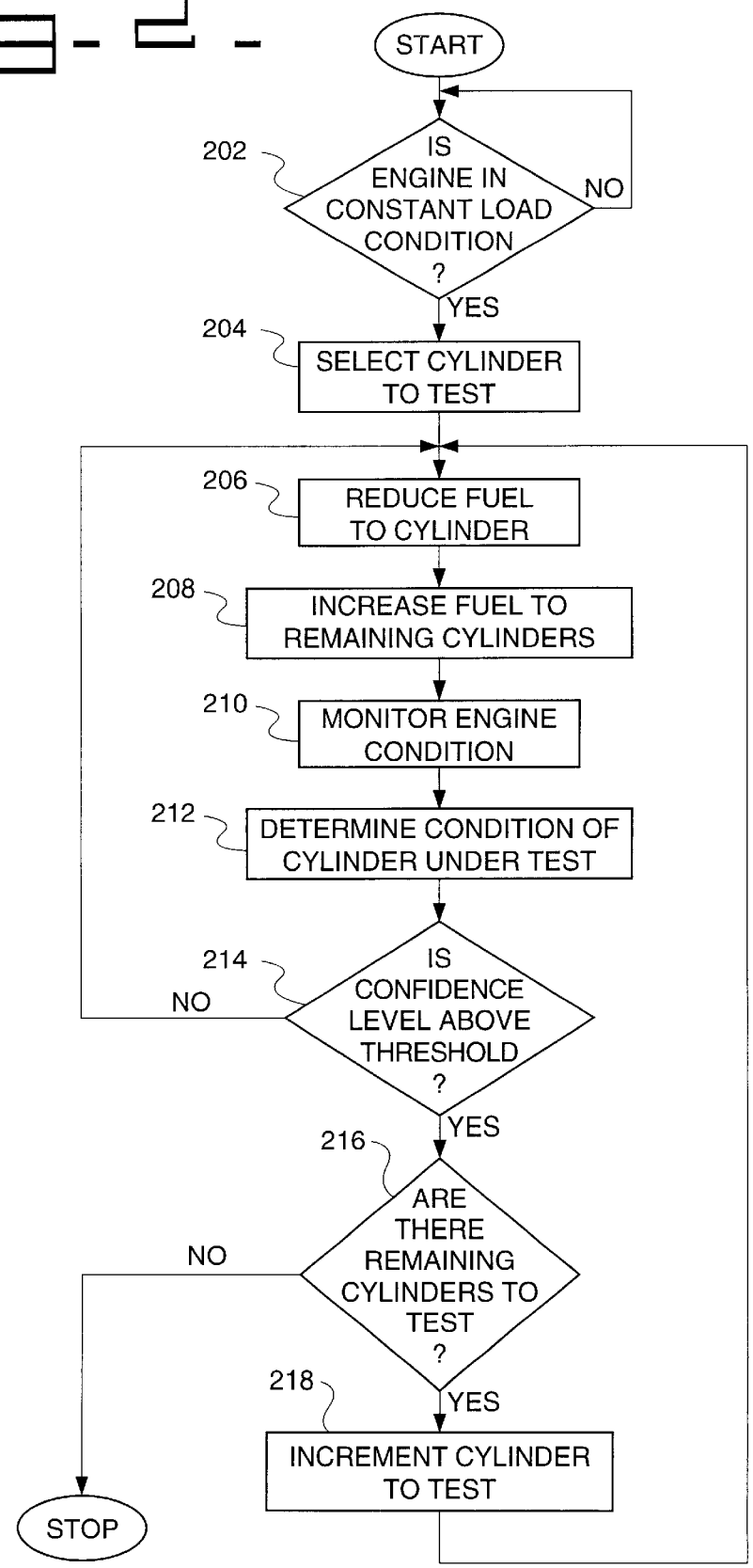

METHOD FOR DETERMINING A WEAK CYLINDER IN AN INTERNAL COMBUSTION ENGINE

TECHNICAL FIELD

This invention relates generally to a method for testing a cylinder in an internal combustion engine and, more particularly, to a method for determining a weak cylinder by the response of the engine during an engine cylinder low power test.

BACKGROUND ART

Internal combustion engines are used to provide power for a variety of machines, including commercial on-highway trucks, earthworking and construction machines, electric power generators, and the like. Generally, it is desired to operate these machines, and hence the internal combustion engines, at a peak operating efficiency with minimal downtime due to machine or engine failure.

One type of problem sometimes encountered with internal combustion engines is the loss of power being generated and delivered due to a weak operating condition associated with one or more of the cylinders in the engine. This situation is often difficult to recognize, and may be made more difficult due to a gradual weakening of one cylinder over a period of time, thus making an awareness of the existence of a problem more difficult. As a result, it is often desired to perform periodic diagnostic analyses of internal combustion engines to ensure that each cylinder of the engine is operating at the expected efficiency.

However, these periodic diagnostic evaluations have, in the past, required downtime of the machine and the additional requirements of external instrumentation and personnel dedicated to conducting the tests. Commercial users of these machines normally cannot afford the high cost of taking machines out of use for the time required to perform this analysis. Therefore, the periodic intervals for engine evaluation may be limited to a minimum, if not eliminated completely. This limitation on checking engine performance may create additional problems, other than reduced fuel economy and lowered machine productivity, in that a minor engine problem may not be serviced until a problem with a weak cylinder becomes so noticeable that additional secondary damage occurs which would require major engine repair.

Attempts have been made to perform diagnostic analysis of cylinders of an engine during normal operating conditions. For example, in U.S. Pat. No. 5,205,152, Clarke et al. discloses (in FIG. 8 and column 8, lines 9–28) a method for evaluating each cylinder in an internal combustion engine by cutting fuel to one cylinder at a time and monitoring the resultant output of the engine. Although this method does provide a means to evaluate the condition of each cylinder in an engine while the engine is operating, it also tends to introduce undesirable crankshaft torsional stresses due to the complete cutout of a cylinder. Additional disadvantages of this method include the need for a special test mode rather than testing which is part of normal engine operation, the need for a person to initiate and monitor the test, changes to the output power of the engine during the test, and higher levels of stresses to the engine during the test.

It is desired to be able to perform diagnostic analysis on each cylinder of an internal combustion engine on a periodic basis during normal use without adversely affecting engine operation.

The present invention is directed to overcoming one or more of the problems as set forth above.

DISCLOSURE OF THE INVENTION

In one aspect of the present invention a method for determining a condition of a cylinder in an internal combustion engine having a plurality of cylinders is shown. The method includes the steps of reducing an amount of power being generated by a first cylinder, increasing an amount of power being generated by each of the remaining cylinders, monitoring a condition of the engine, and determining the condition of the first cylinder in response to the monitored condition of the engine.

BRIEF DESCRIPTION OF THE DRAWINGS

FIG. 1 is a block diagram illustrating a preferred embodiment of the present invention; and FIG. 2 is a flow diagram illustrating a preferred method of the present invention.

BEST MODE FOR CARRYING OUT THE INVENTION

With reference to the drawings and to the appended claims, a method for determining a condition of a cylinder in an internal combustion engine having a plurality of cylinders is disclosed.

With particular reference to FIG. 1, an internal combustion engine 100 includes a plurality of cylinders 102, e.g., 4, 8, 16, or any number of cylinders 102 typically included as part of an engine 100. Preferably, the engine 100 is used to provide primary power to a machine, such as an on-highway truck, an earthworking machine, a construction machine, an electrical power generator, or any of a wide variety of other types of machines.

In the preferred embodiment, the engine 100 is powered by delivery of fuel from a set of actuators 104, the actuators preferably including fuel injectors (not shown) as is well known in the art. Control of the fuel delivery by the actuators 104 is accomplished by a controller 108.

The controller 108 preferably includes a processor 110 of a type well known in the art, such as a Motorola Model No. MC68HC11 microprocessor, or any of a variety of other processors suited for use in an engine control environment. Preferably, the controller 108 also includes input/output buffers/drivers 112 to deliver commands to the actuators 104 and to receive information from various sensors 106, which are discussed in more detail below. The controller preferably also includes a memory 114 for storage of data which may be received from and delivered to the processor 110.

The sensors 106 located on the engine 100 are of many different types using various sensor technologies and methods, and are used for many purposes. For example, for use in the present invention, sensors 106 are preferably included which are adapted to sense such parameters as the speed of the engine 100 and the output power of the engine 100. Such sensors 106 are well known in the art and do not require further discussion as to the nature of how they function.

Referring to FIG. 2, a flow diagram is shown which illustrates a preferred method of the present invention. The testing method depicted in FIG. 2 may, in the preferred embodiment, be initiated by one of two modes. The test may be operator initiated in a manual mode. Alternatively, the test may be configured to initiate automatically, thus providing testing in the background as the engine performs normal operations.

In a first decision block 202, it is determined if the engine 100 is in a constant load condition. For example, during normal operation of an engine 100 on a mobile machine, it may be determined that the machine is traveling on level terrain, and therefore no changes in load on the engine 100 are being experienced due to hills and slopes. If the machine 100 travels a known route repeatedly, this determination may be made consistently at a known location. The window of opportunity needed for conducting a test cycle during a constant load condition is relatively brief, e.g., about one second.

Constant load conditions may be determined by monitoring such conditions as, but not limited to, the desired speed as compared to the actual speed, the position of a fuel rack, i.e., a governor rack, which controls the delivery of fuel to the fuel injectors, the rate of fuel being consumed, and a load determination on the engine.

As another alternative, the present invention could be employed in a test environment where the engine 100 is subjected to constant load conditions for the duration of the testing.

If the engine 100 is determined to be in a constant load condition, control proceeds to a first control block 204, where a first cylinder 102 is selected to test.

In a second control block 206, the amount of power being delivered by the cylinder 102 is reduced by a first predetermined amount, preferably by reducing the amount of fuel being delivered to the cylinder 102. The first predetermined amount may be any value suitable for testing purposes such as, for example, 50% of full power.

In a third control block 208, the amount of power being delivered by each of the remaining cylinders 102 is increased by a second predetermined amount, preferably by increasing the amount of fuel being delivered to each remaining cylinder 102, e.g., by allowing a governor to increase the amount of fuel being delivered. The second predetermined amount may be any value suitable for testing purposes such as, for example, 103% of full power.

In a fourth control block 210, a condition of the engine 100 is monitored. For example, the speed of the engine 100, the fuel rate, i.e., the engine rack, or the output power of the engine 100 may be monitored by use of appropriate sensors 106.

Control then proceeds to a fifth control block 212, where the condition of the cylinder 102 under test is determined. In the preferred embodiment, if the cylinder 102 is operating in a weak condition under full load, the increase in power applied to the remaining cylinders 102 will cause the speed or output power of the engine 100 to increase above a predetermined threshold, since the reduction of fuel delivery to the weak cylinder will have little additional detrimental effect in engine operation due to the cylinder already generating reduced power.

However, if the cylinder 102 is operating in a normal condition under full load, the increase in power applied to the remaining cylinders 102 will be offset by the decrease in power applied to the test cylinder 102, and the speed or output power of the engine will not increase above the predetermined threshold.

Table 1, shown below, indicates examples of expected changes in operating conditions under various test conditions.

TABLE 1

Test Conditions

| ENGINE LOAD | ENGINE SPEED | ENGINE RACK (FUEL RATE) | ENGINE POWER |
| --- | --- | --- | --- |
| Partial - OK | no change | increase | no change |
| Partial - Weak | no change | small increase | no change |
| Full - OK | no change | no change | no change |
| Full - Weak | increase | no change | increase |

In a second decision block 214, it is determined if a predetermined confidence level has been reached. For example, a first round of tests on a first cylinder 102-1 may determine a condition of the cylinder 102-1, but it may be desired to test the cylinder 102-1 additional times to increase the level of confidence in the test results. The confidence level may be a predetermined fixed value, or may be a function of operating parameters of the engine 100, such as the degree of constant load which the engine 100 is subjected to during testing.

If the confidence level is above the threshold, control proceeds to a third decision block 216, where it is determined if additional cylinders 102 remain to be tested. If there are more cylinders 102 to test, control proceeds to a sixth control block 218, where the next cylinder 102 is chosen. At this point, control moves to the second control block 206, where the process is repeated for the next cylinder 102.

The results of the tests may be used in a variety of ways. For example, the status of the cylinders 102 may be displayed to an operator in real time to notify an operator of a possible condition of a weak cylinder 102 developing. In addition, the test results may be stored in memory located on board the machine to allow service personnel to retrieve the results at a later time for analysis. Alternatively, the test results, if a weak cylinder 102 is found, may be delivered by some means, e.g., wireless communications, to a remote site to notify personnel of a developing problem. It is noted that any combination of the above methods for responding to the test results, as well as additional methods not discussed here, may be used with the present invention.

INDUSTRIAL APPLICABILITY

As an example of an application of the present invention, a controller 108 on a machine, as the machine traverses a route or path or performs a work function, may be programmed to perform the above-described cylinder tests on a periodic basis during machine, and hence engine 100, operation. As an alternative, an operator of the machine may decide to initiate the cylinder tests, in which the controller 108 would receive an operator command and responsively activate the method of the present invention. The testing of the cylinders 102 is performed during normal operations of the engine 100, thereby reducing engine downtime and determining the presence of weak cylinders 102 prior to major mechanical breakdown. The power generated by the engine 100 does not change during testing unless a weak cylinder exists. The present invention offers the additional advantage of only requiring the addition of software to already existing control software located on typical modern machines.

Other aspects, objects, and features of the present invention can be obtained from a study of the drawings, the disclosure, and the appended claims.

What is claimed is:

1. A method for determining a condition of a cylinder in an internal combustion engine having a plurality of cylinders, including the steps of:
   (a) reducing an amount of power being generated by a first cylinder to a lesser predetermined positive amount less than full power.
   (b) increasing an amount of power being generated by each of the remainder of the plurality of cylinders to a greater predetermined amount greater than full power.
   (c) monitoring a condition of the engine in response to steps (a) and (b); and
   (d) determining a condition of the first cylinder in response to the monitored condition of the engine.

2. A method, as set forth in claim 1, including the steps of:
   (e) repeating step (a) for a next cylinder; and
   (f) repeating steps (b) through (d) for each next cylinder.

3. A method, as set forth in claim 2, including the step of:
   (g) repeating steps (a) through (f) a predetermined number of times until a predetermined confidence level for each cylinder is reached.

4. A method, as set forth in claim 3, wherein reducing an amount of power generated by one of a first and a next cylinder includes the step of decreasing an amount of fuel delivered to the one of a first and a next cylinder, and wherein increasing an amount of power generated by each of the remaining cylinders includes the step of increasing an amount of fuel delivered to each of the remaining cylinders.

5. A method, as set forth in claim 3, wherein monitoring a condition of the engine includes the step of monitoring at least one of a speed, a fuel rate, and an output power of the engine.

6. A method, as set forth in claim 5, wherein the condition of the one of a first and a next cylinder is determined to be weak in response to one of the speed and output power of the engine increasing in value above a predetermined threshold, and wherein the condition of the one of a first and a next cylinder is determined to be normal in response to one of the speed and output power of the engine not increasing in value above the predetermined threshold.

7. A method, as set forth in claim 1, wherein steps (a) through (c) are performed with the engine in a constant load condition.

8. A method, as set forth in claim 6, wherein the output power of the engine is maintained at a constant value during steps (a) through (c) in response to the one of a first and a next cylinder being determined to be normal.

9. A method, as set forth in claim 3, wherein steps (a) through (g) are performed during normal operation of the engine.

10. A method, as set forth in claim 1, wherein steps (a) through (c) are performed during a time interval of about one second.

11. A method for determining a condition of a cylinder in an internal combustion engine having a plurality of cylinders, including the steps of:
    (a) delivering a reduced amount of power by a first cylinder, less than full power;
    (b) delivering an increased amount of power by each of the remainder of the plurality of cylinders, greater than full power;
    (c) monitoring a condition of the engine in response to steps (a) and (b); and
    (d) determining a condition of the first cylinder in response to the monitored condition of the engine.

12. A method for determining a condition of a cylinder in an internal combustion engine having a plurality of cylinders, including the steps of:
    (a) reducing an amount of power being generated by a first cylinder to a lesser predetermined amount, less than full power;
    (b) increasing an amount of power being generated by each of the remainder of the plurality of cylinders to a greater predetermined amount, greater than full power;
    (c) monitoring a condition of the engine in response to steps (a) and (b); and
    (d) determining a condition of the first cylinder in response to the monitored condition of the engine.

* * * * *